C. W. JAYCOX.
GLASS WASHING APPARATUS.
APPLICATION FILED JAN. 5, 1909.
942,074.
Patented Dec. 7, 1909.
2 SHEETS—SHEET 2.
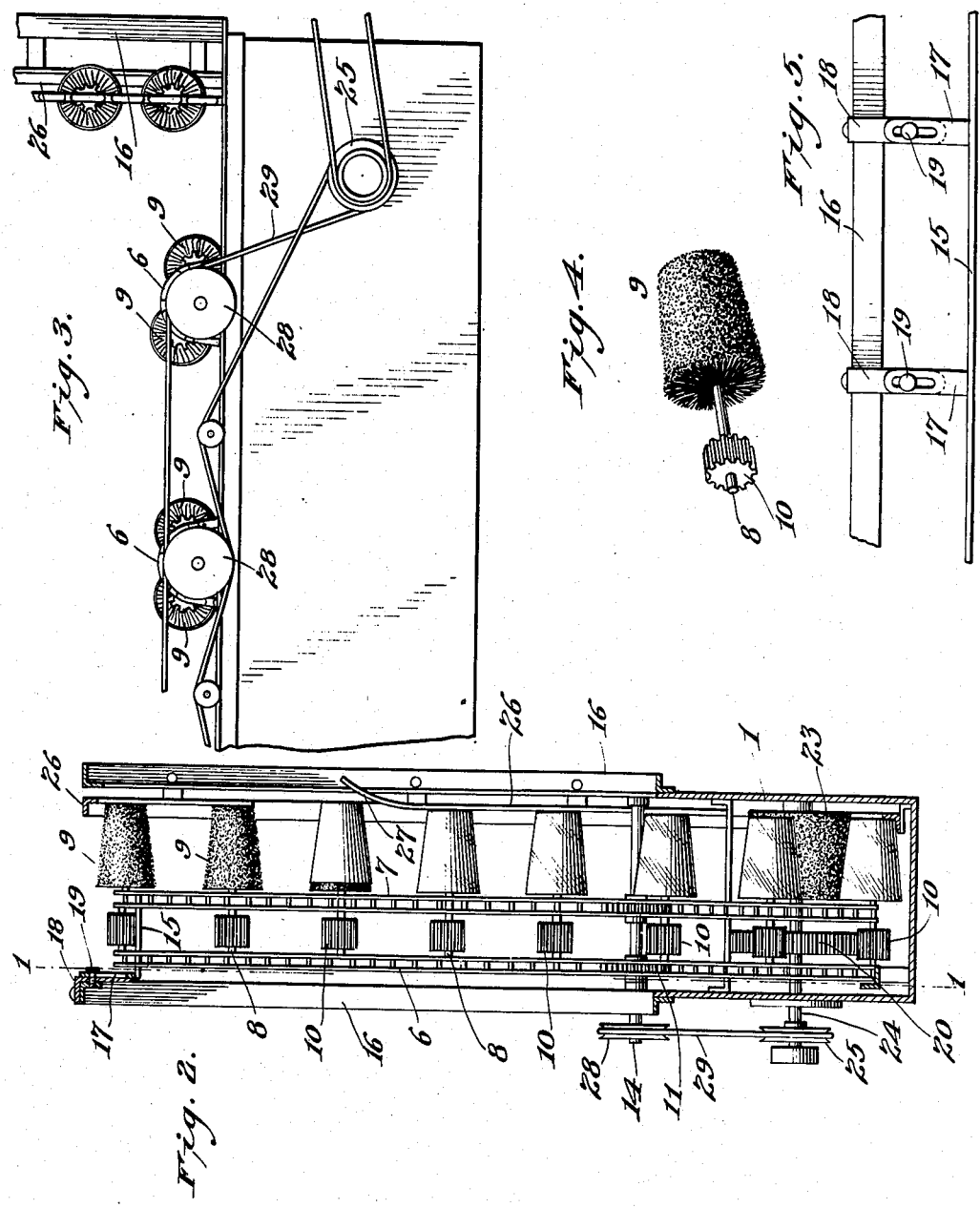
Witnesses
M. C. Syddans
J. A. L. Mulhall.
Inventor
Charles W. Jaycox
By Joshua R. H. Potts.
Attorney ated Dec. 7, 1909.

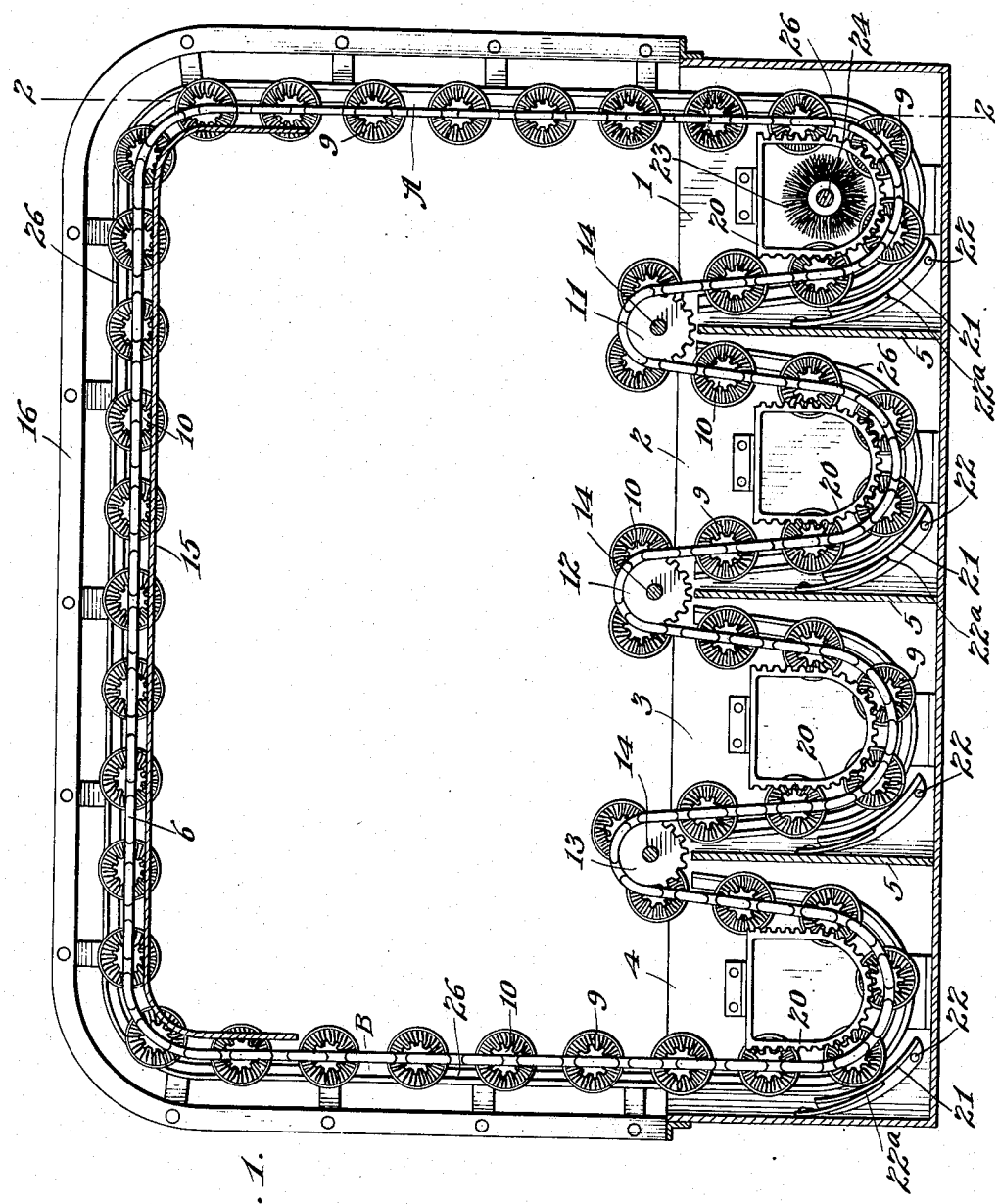

UNITED STATES PATENT OFFICE.

CHARLES W. JAYCOX, OF PHILADELPHIA, PENNSYLVANIA.

GLASS-WASHING APPARATUS.

942,074.

Specification of Letters Patent.

Patented Dec. 7, 1909.

Application filed January 5, 1909. Serial No. 470,747.

*To all whom it may concern:*

Be it known that I, CHARLES W. JAYCOX, a citizen of the United States, residing at Philadelphia, in the county of Philadelphia and State of Pennsylvania, have invented certain new and useful Improvements in Glass-Washing Apparatus, of which the following is a specification.

My invention relates to an improved glass washing apparatus, which is designed for passing the glasses through baths of suitably prepared water, and to subject the same to the action of external and internal brushes to thoroughly scrub them, and render them perfectly clean when removed from the apparatus.

A further object is to provide an endless conveyer carrying a series of brushes, adapted to receive, upon any and all of them, the ordinary drinking glasses and convey the latter through a series of tanks containing respectively, soap and hot water, sterilizing water, hot water, and cold water, and provide means for holding the glasses and revolving the brushes therein, and provide a brush for scrubbing the glasses externally in their transit through the first tank.

A further object is to provide improved means for holding the glasses on the brushes, and improved means for holding the glasses against movement, or rather tending to turn them in a direction opposite to the direction of rotation of the internal brushes.

A further object is to provide an endless conveyer or carrier having glass receiving brushes thereon, and provide improved mounting for the carrier, to enable the latter to be adjusted to take up slack.

With these and other objects in view, the invention consists in certain novel features of construction, and combinations, and arrangements of parts as will be more fully hereinafter described and pointed out in the claims.

In the accompanying drawings, Figure 1, is a view in section on the line 1—1 of Fig. 2. Fig. 2, is a view in section on the line 2—2 of Fig. 1. Fig. 3, is a fragmentary view in elevation looking at the rear of the apparatus. Fig. 4, is a detail perspective view of a glass receiving brush and its operating pinion, and Fig. 5, is a detail view illustrating the manner of supporting the track.

1, 2, 3 and 4 represent tanks, or compartments, which are preferably formed in a single receptacle by means of vertical partitions 5. The tank 1 is preferably adapted to contain soap and hot water, tank 2 sterilizing water, tank 3 hot water, and tank 4 cold water, so as to subject the glasses to these several waters to thoroughly cleanse them.

6 and 7 represent endless sprocket chains connected at regular intervals throughout, by means of shafts 8, the latter projecting out beyond chains 7, and carrying brushes 9 of the general shape of a truncated cone, and gear wheels or pinions 10 are secured on the shafts 8 between the chains 6 and 7, to revolve the brushes 9, as will hereinafter appear. These chains 6 and 7 move over sprocket wheels 11, 12 and 13 respectively, secured upon shafts 14 just above the vertical partitions 5, and also mounted to move across a track 15 at the upper portion of the arched frame 16, the latter being secured to the tanks or receptacle in any approved manner. This track 15 is provided with slotted lugs 17, and lugs 18, on the frame 16, are adapted to receive set screws 19 located in the slots of the lugs 17 and lock the track against vertical movement, but permit of its adjustment vertically to take up slack in the chains. This track is in effect, a track on which the pinions 10 roll, and hence when moved upward, the tension of the chains will be tightened throughout.

The chains, in the tanks 1, 2, 3 and 4, pass around toothed racks 20, with which the pinions 10 mesh, so as to revolve the pinions, and the brushes 9 carried thereby, inside of the glasses, the latter being held against rotary motion or revolved in a direction, reverse to that of the brush, by means of friction blocks 21, located in all of the tanks. These friction blocks 21 are pivotally secured at one end as shown at 22, and springs 22ª bear against the other ends of said blocks, so as to hold them in frictional engagement with the glasses, as the latter are moved along by the conveyer.

In the tank 1 a large rotary brush 23 is secured upon the shaft 24 extending outside of the tank, and driven by a pulley 25. This brush is of a size, so as to contact with the glasses throughout a considerable portion of their travel through tank 1, and thoroughly scrub and cleanse the outside of the glasses.

The glasses are held against lateral displacement on the brushes 9 by means of a guard strip 26. This guard strip extends throughout the path of movement of the conveyers, and is preferably of angle iron form, so as to project over the end of the glasses and hold them against movement off of the brushes. This guard 26 is broken at points A and B, so as to allow the glasses to be inserted on the brushes and removed therefrom, they being preferably inserted at A and removed at B. They may of course, be carried back to A and be placed on the brushes and removed at the same point.

At the point A, the guard is bent outwardly as shown at 27, so that should a careless operator put the glass but partially on the brush, as shown in Fig. 2, the cam action of the bent out guard 27 will force the glass entirely onto the brush.

While I have stated that the guard 26 extends throughout the entire path of the conveyer, this is not exactly true, as the guard will be preferably broken adjacent to the sprocket wheels 11, and at the points A and B, but at all other points the guard will be provided so as to prevent the glasses from accidentally falling from the brushes 9.

In operation, the dirty glasses are placed upon the brushes 9, as the latter move past the point A, and are carried down into tank 1, where they are subjected to the action of soap and water. The brushes 9 will be revolved by their pinions 10 when the latter come into engagement with the racks 20, and the glasses will be held or turned in a reverse direction by the friction blocks 21, while the outside of the glasses will be thoroughly scrubbed by the large rotary brush 23. The glasses are next conveyed into tank 2, which preferably contains sterilizing water of any kind, into which the glasses are thoroughly immersed, and thence into tank 3 containing hot water, and then into tank 4 containing cold water, so that when the glasses pass to the point B, they are thoroughly cleansed and ready for drying. As above explained, the glasses may be conveyed throughout the entire length of the conveyer, back to the point A and removed at this point.

Pulleys 28 are provided on the shafts 14, and a pulley 25 on shaft 24 driven by a band or belt 29 in any desired manner.

A great many slight changes might be made in the general form and arrangement of parts described without departing from my invention, and hence I do not restrict myself to the precise details set forth, but consider myself at liberty to make such changes and alterations as fairly fall within the spirit and scope of my invention.

Having thus described my invention what I claim as new and desire to secure by Letters Patent is:

1. In an apparatus of the character described, the combination with a tank adapted to contain cleansing fluid, of a guide frame, a conveyer supported on said frame and constructed to pass through said tank, rotary brushes carried by said conveyer and adapted to support glasses thereon, and means for turning said brushes.

2. In an apparatus of the character described, the combination with a tank adapted to contain cleansing fluid, of a guide frame, a conveyer supported on said frame and constructed to pass through said tank, rotary brushes on said conveyer and adapted to receive glasses thereon, means for turning said brushes, and means for cleaning the outside of the glasses.

3. In an apparatus of the character described, the combination with a series of tanks adapted to contain cleansing fluids, of a guide frame, a conveyer supported on said frame and constructed to pass through said tanks, brushes carried by said conveyer and adapted to receive glasses thereon, means for holding the glasses on the brushes, and means for revolving the brushes in the tanks.

4. In an apparatus of the character described, the combination with a series of tanks adapted to contain cleansing fluids, of a guide frame, a conveyer supported on said frame and constructed to pass through said tanks, brushes carried by said conveyer and adapted to receive glasses thereon, means for holding the glasses on the brushes, means for revolving the brushes in the tanks, and means in the tanks for holding the glasses while the brushes turn.

5. In an apparatus of the character described, the combination with a series of tanks adapted to contain cleansing fluids, of a guide frame, a conveyer supported on said frame and constructed to pass through said tanks, brushes carried by said conveyer and adapted to receive glasses thereon, means for holding the glasses on the brushes, means for revolving the brushes in the tanks, means in the tanks for holding the glasses while the brushes turn, and a rotary brush in one of said tanks engaging the outside of the glasses.

6. In an apparatus of the character described, the combination with a series of tanks, of a guide frame, two parallel endless chains supported on said frame and movable through said tanks, shafts connecting said chains and projecting beyond the same, glass-receiving brushes on said shafts, pinions on said shafts between the chains, and fixed racks in the several tanks in the path of said pinions whereby the pinions are revolved to revolve the brushes.

7. In an apparatus of the character described, the combination with a series of tanks, of a guide frame, two parallel endless chains supported on said frame and movable through said tanks, shafts connecting said chains and projecting beyond the same, glass-receiving brushes on said shafts, pinions on said shafts between the chains, fixed racks in the several tanks in the path of said pinions whereby the pinions are revolved to revolve the brushes, and friction blocks in said tanks adapted to engage the outside of the glasses.

8. In an apparatus of the character described, the combination with a series of tanks, of a guide frame, two parallel endless chains supported on the frame and movable through said tanks, shafts connecting said chains and projecting beyond the same, glass-receiving brushes on said shafts, pinions on said shafts between the chains, fixed racks in the several tanks in the path of said pinions whereby the pinions are revolved to revolve the brushes, friction blocks in said tanks adapted to engage the outside of the glasses, and a rotary brush in one of said tanks engaging the outside of the glasses.

9. In an apparatus of the character described, the combination with a series of tanks, sprocket wheels supported above the tanks, sprocket chains movable on said sprocket wheels and through the tanks, a frame supported on said tanks, a track supporting the upper portion of said chains, lugs on said frame, slotted lugs on said track, means for locking said lugs together to permit vertical adjustment of the track to take up slack in the chains, and rotary glass-receiving brushes carried by said chains.

In testimony whereof I have signed my name to this specification in the presence of two subscribing witnesses.

CHARLES W. JAYCOX.

Witnesses:
R. H. KRENKEL,
J. A. L. MULHALL.